Baham, Wilson & French,
Card-Setting Machine.
No. 80,586.  Patented Aug. 4, 1868.
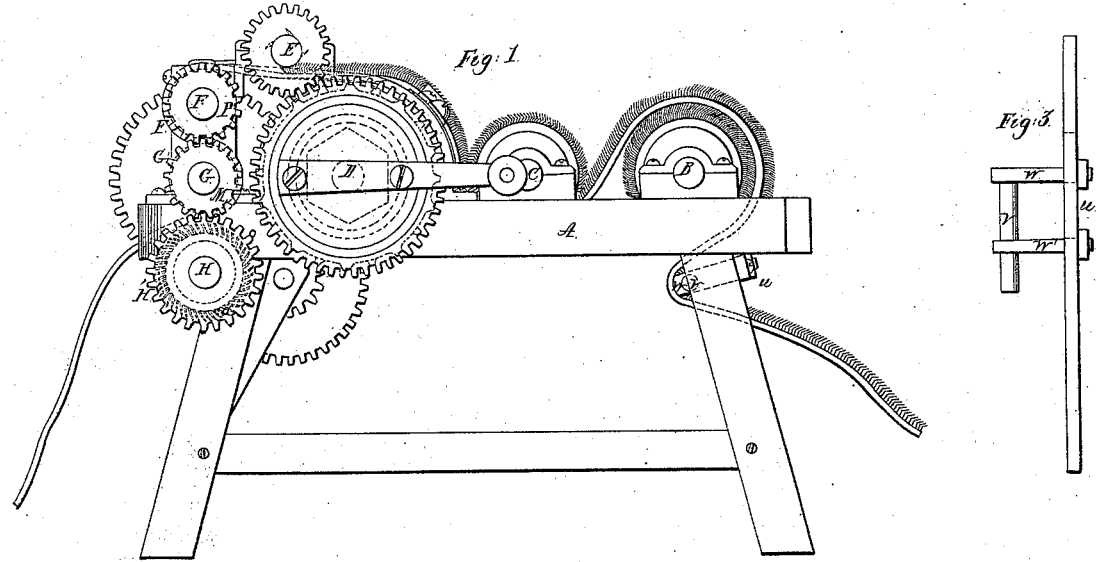
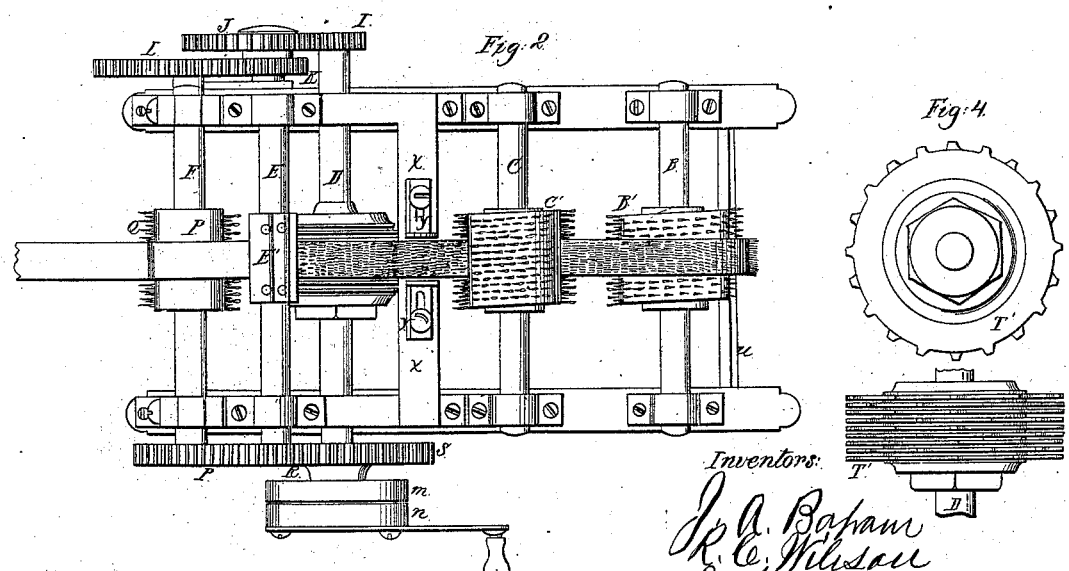
Witnesses:
Inventors:

United States Patent Office.

JOHN A. BAHAM, ROBERT C. WILSON, AND SAMUEL FRENCH, OF AUBURN, NEW YORK.

*Letters Patent No. 80,586, dated August 4, 1868.*

IMPROVEMENT IN MACHINE FOR REMOVING WIRE TEETH FROM CARDS.

*The Schedule referred to in these Letters Patent and making part of the same.*

TO ALL WHOM IT MAY CONCERN:

Be it known that we, JOHN A. BAHAM, ROBERT C. WILSON, and SAMUEL FRENCH, of Auburn, in the county of Cayuga, and in the State of New York, have invented certain new and useful Improvements in Machine for Removing the Wire Teeth from Cards; and do hereby declare that the following is a full, clear, and exact description thereof, reference being had to the accompanying drawings, and to the letters of reference marked thereon.

In the annexed drawings, making part of this specification—

A represents a square frame, supported upon suitable legs, and made in a substantial manner. Lying crosswise of this frame, and having bearings in it, are the shafts B, C, D, E, F, G, and H, the object of which will be described.

The shafts C and B are situated near one end of the machine, a little distance apart, and are provided with drums, C' B', in the peripheries of which are numerous fine teeth. The object of these toothed drums is to hold and feed up the cards from which the teeth are to be extracted to the device which extracts them. The card is passed over drum B' and under drum C'.

Upon a portion of the frame, which is elevated above the main portion, is secured a curved plate, $x$. This plate $x$ lies a sufficient distance from the periphery of drum C' to allow the card to pass between them. After the card has passed under drum C', it passes up between said drum and the curved plate $x$, and between two adjustable guides, $y\ y$, on said plate.

The shaft D is provided with a loose pulley, $m$, a tight pulley, $n$, and a gear-wheel, S, at one end, and with a gear-wheel, I, at its other end, and at its centre with a drum, composed of a series of toothed wheels, T'. The teeth of these wheels are very similar to saw-teeth, but their ends, instead of being pointed, are square, as seen in fig. 4. The card, after passing over the plate $x$, passes over the toothed wheels T', presenting its back to them.

The shaft E, which has its bearings in the elevated portion of the frame, is provided at one end with a gear-wheel, R, which gears into wheel S, and also with a series of knives, E'. The card, after passing from the toothed wheels T', passes under the cutters or knives E', and, said knives revolving with shaft E, clean off the face of the leather of the card, after the teeth are removed.

The shafts F, G, and H lie in the same vertical plane, shafts F and G being provided with drums P and M, which are plain upon their peripheries, while shaft H is provided with a drum, in the periphery of which are fine-pointed teeth. The leather of the card, after passing from the knives E', passes over drum P, then between drums P and M, and then between drums M and Q, on shaft H. These drums hold the leather tightly between, and serve to draw the card through the machine.

The shafts F, G, and H are revolved with suitable gearing, connected with that of shaft D, as follows:

The gear-wheel I of shaft D gears into a wheel, J, upon a short shaft at one side of the frame A. This short shaft has upon it another gear-wheel, K, which gears into a wheel, L, on one end of shaft G. Upon the other end of shaft G is a gear-wheel, G', which gears into a gear-wheel, H', on shaft H, and into a gear-wheel, F', on shaft F, thus connecting the series of wheels together.

At one end of the machine, and beneath the shaft B, is a cross-bar, U, which has two arms projecting from it, marked W W', both of which have holes through them, near their outer ends, through which a rod, V, passes. One of the arms, W', is adjustable, having one end passing through a slot in the bar U. The card passes between the bar U and rod V and arms W W', the arm W' being adjusted to the width of the card.

In using this machine, the card is first passed between the rod V and bar U, then up and over the toothed drum B', its back being presented to or resting upon said drum. It then passes under drum C', with its toothed or face side resting against said drum. It then passes up over the plate $x$, between guides $y\ y$, then over the toothed wheels T', presenting its back to them; then it passes under knives E', then over drum P, then between drums P and M, then between M and the toothed drum Q.

The toothed drum B' partially loosens up the wires, and the toothed wheels T' remove them by their teeth catching into the loops of the wires on the back of the card. The knives E' serve, as has been stated, to clean the face of the leather after the wire has been drawn out, while the drums P, M, and Q serve to hold and draw the card through the machine. The plate $x$ is provided with slots, through which it is secured to the elevated frame, and, by means of these slots, can be adjusted to or from the card, to regulate its pressure on the wheels T'.

Having thus fully described our invention, we claim—

1. The toothed drums B' and C', the card-guide upon the bar U, and the adjustable plate $x$, provided with the guides $y\ y$, combined and arranged substantially as and for the purpose set forth.

2. The toothed wheel T', when used in combination with the drums B' and C', as and for the purpose set forth.

3. The knives E' and wheel T', in combination with the drums P, M, and Q, constructed and operating as and for the purpose set forth.

In testimony that we claim the foregoing, we have hereunto set our hands, this 3d day of February, 1868.

JOHN A. BAHAM,
ROBERT C. WILSON,
SAMUEL FRENCH.

Witnesses:
　JAMES LYON,
　EDWARD A. THOMAS.